United States Patent Office 3,809,743
Patented May 7, 1974

3,809,743
PROCESS FOR TREATING AUTOMOTIVE EXHAUST
Mark L. Unland, Creve Coeur, and George E. Barker, St. Louis, Mo., assignors to Monsanto Company, St. Louis, Mo.
No Drawing. Filed Jan. 7, 1972, Ser. No. 216,224
Int. Cl. B01d 50/00
U.S. Cl. 423—213.5    21 Claims

ABSTRACT OF THE DISCLOSURE

For use in the treatment of automobile exhaust gases, a catalyst combination having both oxidation and reduction capability is employed in a first converter, the catalyst having a ruthenium containing section followed by a section containing another noble metal, e.g., rhodium. Nitrogen oxides are removed with little production of ammonia.

BACKGROUND OF THE INVENTION

The present invention relates to means of removing noxious materials from engine exhausts. In particular the invention concerns processes for reducing nitrogen oxides present in exhaust of automotive engines, and to catalysts useful in such processes.

It is well known that when hydrocarbon fuels are burned in automotive engines that combustion is incomplete. This applies whether the engine is of the internal combustion type or other alternative vehicular power sources. Substantial amounts of fuel are either left unburned or are only partly combusted. Thus automotive exhaust contains large amounts of carbon monoxide and hydrocarbons along with carbonaceous residues (particulate form) among products of incomplete combustion which are generally considered to be noxious. In addition a fourth general category of pollutant is formed, termed $NO_x$ (NO and $NO_2$). Products of complete combustion are also present in large amounts and consist of water and carbon dioxide. Remnants of air employed to combust the hydrocarbon fuel include oxygen and nitrogen. Hydrogen is generally present along with components emanating from the composition of the hydrocarbon fuel utilized.

The instantaneous composition of vehicular exhaust is a function of many factors, including parameters relating to engine design, and tuning, and driving mode, as well as fuel composition. Thus it is difficult to specify a typical exhaust composition. Generally speaking, however, when present day automobile engines are started cold, carbon monoxide levels of about 5 to about 15 volume percent, along with hydrocarbon levels of about 5,000 to about 15,000 parts-per-million are not unusual.

Carbon monoxide and hydrocarbon levels fall rapidly after engine start to levels of about 3 percent and 1000 parts-per-million respectively in about the first 100 seconds of engine operation. As the engine continues to warm to normal operating temperatures exhaust compositions containing about 1 to about 2 percent carbon monoxide and several hundred parts-per-million hydrocarbon are oftentimes observed with present day automobiles.

Nitrogen oxide evolution with present automobile engines is closely tied in part to engine tuning and driving mode. For example, with very lean and very rich air to fuel ratios, nitrogen oxide emissions are relatively low. In between, higher emissions are observed. In addition, relatively higher $NO_x$ emissions result from high speed driving modes. Generally, $NO_x$ emissions are less than 0.3 or 0.4% on a volume basis, and on the average are 0.15%.

Exhaust gases from automotive engines contribute a substantial portion of total air pollutants in many areas, for example urban areas, today. Thus, unburned hydrocarbons, carbon monoxide, particulate matter and $NO_x$—particularly NO, are typical constituents of automotive exhaust which contribute to air pollution. Accordingly, means have been sought to control said emissions. Improved systems for controlling emissions of hydrocarbons and carbon monoxide, such as finer control of fuel combustion, have already been implemented. Such improvements, however, have led to an increase in $NO_x$ emissions rather than a decrease.

It is known that under certain circumstances nitrogen oxides are reducible through use of certain reducing agents over noble metal catalysts. In addition, ruthenium has been disclosed in a catalyst for removal of nitrogen oxides from exhaust of internal combustion engines.

It is further known that purification of automotive exhaust presents a difficult problem, in part due to the variety of pollutants contained therein. For example, certain impurities are conveniently rendered non-noxious by oxidation while others can be reduced to non-noxious products. Examples in the former category include carbon monoxide and hydrocarbons while $NO_x$ is an example of a pollutant which can be removed through a reductive treatment. Consequently, different modes of removal may be required for removal of different types of impurities.

While procedures may be designed for removal of one pollutant type, such procedures must be considered with respect to their applicability in the presence of other exhaust gases, the possible production of new pollutants, and as to their compatability with procedures for removing other pollutants. For example, it is known that most catalysts will promote the production of $NH_3$ from the exhaust of an engine operated in a fuel-rich or reducing mode. Presumably, the $NH_3$ is formed from the reaction of $NO_x$ with $H_2$ which is known to be present in the exhaust or with atomic or molecular hydrogen which may be produced in situ via the water gas shift reaction over the catalyst of interest. Regardless of the method of production, the fact remains that $NH_3$ is often found in the effluent gas stream after passage of the exhaust gases over the catalyst bed. In spite of the fact that $NH_3$ in an automobile exhaust is not at present, legally a pollutant, is most certainly an obnoxious effluent component which cannot be tolerated and care must be taken either to prevent its formation or provide for its subsequent removal. In addition, the $NH_3$ is undesirable because under certain conditions of temperature and catalyst, it can react with CO to give HCN and $CO_2$. Indeed, as much as 30 p.p.m. cyanide has been found in water trapped from the effluent of a reactor containing certain noble metal catalysts when using synthetic auto exhaust mixtures as feed. Further, if the $NO_x$ converter is followed by a second converter for oxidation of hydrocarbons and CO, the $NH_3$ will quite probably be reoxidized to $NO_x$ and the overall $NO_x$ removal will thereby be reduced.

The generation of ammonia by an exhaust gas catalyst constitutes a definite problem which may render a catalyst completely unsatisfactory for practical use. However, the importance of this factor has often been overlooked, and ammonia in the effluent from such catalysts has often not even been measured. Moreover it has not previously been recognized that ruthenium is capable of effectively reducing $NO_x$ even under fuel rich conditions with very little production of ammonia.

SUMMARY OF THE INVENTION

The present invention involves use of a catalyst combination having both a reduction and an oxidation capability in a manner to reduce nitrogen oxides without generation of excessive amounts of ammonia. The invention utilizes a catalyst bed which has a ruthenium containing portion or section followed by a portion or section containing another noble metal, under reducing conditions to remove nitrogen oxides from exhaust gases of internal combustion engines. The invention further involves use of the catalyst combination in a procedure in which secondary air is added to the exhaust gases in advance of the catalyst for a short time after engine start up, so that exothermic oxidation can quickly heat the catalyst bed and remove oxidizable pollutants from the gases during the early stages of the engine operation before a second downstream catalyst bed containing oxidation catalyst is raised to an effective oxidation temperature. The invention further involves use of a ruthenium containing catalyst followed by a rhodium containing catalyst under reducing conditions in an automobile exhaust stream. The combination catalyst can be used in conjunction with a downstream oxidation converter in which hydrocarbons and carbon monoxide can be oxidized without the necessity of precise temperature control to avoid oxidation of ammonia to $NO_x$.

DETAILED DESCRIPTION OF THE INVENTION

In effecting the present invention, a dual catalyst converter system is ordinarily employer. The system is provided with means for injecting a secondary air stream into the exhaust gases selectively, either in advance of the first converter, or between the first and second converters, with switching means to determine the place of injection. The first converter is provided with two catalyst sections or layers, the upstream section containing ruthenium, and the second section containing another noble metal catalyst. During operation when the engine is first started, the secondary air stream is directed into the exhaust for a short time so that it passes through the first converter where the carbon monoxide and hydrocarbon components are oxidized primarily by the second section of noble metal catalyst. After a short time, possibly 10 to 200 seconds, or when a desired temperature has been attained, the secondary air is switched so that it passes only through the second converter which attains a temperature sufficient to oxidize the carbon monoxide and hydrocarbon components. The first converter is now operated under reducing conditions so that $NO_x$ constituents are removed, mainly by reduction to nitrogen and water. The reduction occurs to a considerable extent over the ruthenium catalyst in the upstream layer, but the other noble metal catalyst in the second layer may also effect some useful reduction. However, the purpose of the other noble metal catalyst is primarily the oxidation of oxidizable components during initial operation as described above. The engine will generally be operated with a feed slightly on the rich side, e.g., in the air to fuel ratio, from a deficiency of about 1.5 pounds of air in the air to fuel ratio, up to a stoichiometric air to fuel ratio, with the ratio being on a lbs./lbs. basis. It will be recognized that the foregoing refers to conditions on the average, and that there can be periods when the engine is operated on the lean side, or at more rich conditions than described.

The $NO_x$ control in the present process is effected by contacting the exhaust stream with a ruthenium containing catalyst in an overall reducing environment. Automobile exhaust contains substantial amounts of carbon monoxide, lesser amounts of hydrocarbon, and $NO_x$ as major pollutants. In addition, oxygen is present in variable amounts. Large amounts of oxygen, particularly oxidizing amounts supplied continuously, retard the reduction of $NO_x$, either directly or by reaction with the reducing components of the exhaust gases. It is therefore necessary for $NO_x$ reduction that, on the average, the operation with the catalysts of the present invention be conducted under reducing conditions, i.e., that the amount of oxygen present be less than that required to oxidize all the reducible components of the exhaust. It is desirable in the present system that the Ru catalyst be placed close to the exhaust manifold (so-called post-manifold position) to take advantage of the rapid heating possible at that point. The air-to-fuel ratio of the engine is coarsely regulated to the point of being, on the average, on the fuel-rich side of stoichiometric, with only brief periods of operation on the lean sides. This will provide enough reducing agent in the exhaust stream to react with all $NO_x$ which may be present. The good activity, poison resistance, and thermal stability of the Ru catalysts will provide adequate $NO_x$ removal without excessive production of $NH_3$.

Also within our invention is the concept of the use of a second bed of catalyst downstream from the $NO_x$ converter to oxidize the remaining amounts of hydrocarbon and carbon monoxide. To insure proper operation of the oxidation catalyst, additional air should be injected into the exhaust stream after the $NO_x$ converter and before the oxidation catalyst. A major point of importance in this embodiment is the use of an $NO_x$ catalyst which will not form appreciable amounts of $NH_3$ since a major portion of any $NH_3$ so formed will be reoxidized to $NO_x$ during passage over the oxidation catalyst, unless conditions are carefully controlled, and thereby drastically reduce the overall efficiency of the system for $NO_x$ removal. It has been discovered that Ru is unique among the noble metals in its ability to reduce $NO_x$ in a reducing environment such as may be encountered in auto exhaust to products other than $NH_3$ with a high degree of selectivity. This high degree of catalyst selectivity is, of course, essential to the successful control of $NO_x$ in the embodiment hereinbefore described.

The second or downstream section of the first converter employed in our invention contains a Group VIII noble metal catalyst other than ruthenium selected from the group rhodium, iridium, platinum or palladium. The main purpose of this catalyst is to provide oxidizing capability during the initial stages of engine operation after start up. Noble metals are particularly suited for this because of a number of properties, including good oxidation activity, thermal stability, resistance to poisoning, etc. Another factor is the fact that noble metals in general are effective in lower mass concentrations than base metal catalysts, and this is important for a catalyst which must switch rapidly from a reduction catalyst to an oxidation catalyst during sequence of engine operation. It is further essential that the catalyst employed for oxidation in the first converter either operate as a useful reduction catalyst during operation under reducing conditions, or at least not interfere by generating excessive amounts of ammonia or other undesirable products. The noble metals are well-suited for this purpose when placed after the ruthenium generating ammonia from $NO_x$ under rich conditions around 400 to 500° C. In such position they are not contacted by sufficient $NO_x$ to cause excessive ammonia production. Moreover, some of the noble metals, e.g. rhodium, have particularly useful $NO_x$ removal capability at or near the stoichiometric point. In addition, some noble metal and other catalysts are useful ammonia decomposition catalysts at temperatures of 600°–700° C., and will be useful for that purpose if such temperatures are attained. As the second catalyst section, rhodium, or catalysts including rhodium are preferred. Platinum and iridium are also effective. Palladium is also effective catalytically, but long term effectiveness might be difficult to attain because of stability problems. Noble metals which are effective oxidation catalysts can be used, and the foregoing examples are noble metals of Group VIII of the Periodic Table of the Elements. Ir-Co- or Rh-Co-containing catalysts can also be used. Base metals such as nickel and cobalt which are effective ammonia decomposition catalysts, particularly at temperatures of 600 to 700° C., or so, and are also effective oxidation catalysts, may be employed as the second catalyst section in the first converter with some benefit, but are subject to sulfur poisoning if a fuel containing sulfur contaminants is used.

It is important that the exhaust gases contact the ruthenium prior to contacting the other noble metals, in order to avoid ammonia production. It is also necessary to have a different noble metal in the second section, as ruthenium is a relatively poor oxidation catalyst. However, if desired, the second section can contain ruthenium along with another noble metal.

The different catalyst actives in the two sections are generally on different masses of support. When a unitary monolithic support is used, it is feasible to have both actives on the same support, with ruthenium on an upstream portion, and the other noble metal or metals on a downstream portion. However, for ease of impregnation and preparation of the supports, it is generally more convenient to prepare separate monolith pieces with the different actives, and then use them back-to-back. Supports in the form of small particles, such as spheres, rings, etc. can conveniently be prepared by separate procedures with different actives, and then packed in layers. Ordinarily there are certain advantages in the use of a monolithic support in the first converter, in that such supports usually have a lower heat capacity and gas flow resistance for a given catalytic capacity, and are therefore suited for attaining a rapid heat-up in a post manifold converter, with a minimum lag in conveying hot gases to heat up the second converter. It is also advantageous to keep the size and mass of the first converter reasonably small in order to have a small heat capacity, and to rely upon a second converter to remove the oxidizable contaminants during ordinary driving following the start-up stage.

In effecting the present invention, the problem of rapidly bringing the system to operating temperature is recognized. Also, due in part to heat-up problems, the shortcomings of Ru as an oxidation catalyst must be recognized and compensation made for them. Immediately upon starting the engine, a 30 second or so pulse of air is mixed with the exhaust stream before it reaches the first, i.e. $NO_x$, converter. The purpose of the air pulse is to burn CO and hydrocarbons in the $NO_x$ converter thereby providing the exothermic heat of reaction of CO and hydrocarbons in addition to the sensible heat of the exhaust stream for the purpose of rapidly bringing both converters to operating temperature. This means that the catalyst in the first converter must have good CO oxidation as well as $NO_x$ reduction capabilities. The Ru catalyst, having only moderate CO oxidation capability is assisted in this embodiment by placing a bed of good oxidation catalyst such as Pt or Rh on alumina immediately behind it. After the 30 second air pulse is over, the oxidation catalyst, if properly chosen, can function as a high temperature $NH_3$ decomposition catalyst or as an $NO_x$ reduction catalyst. An example of a catalyst which can assist the Ru containing $NO_x$ catalyst by serving both as an oxidation igniter and as a high temperature $NH_3$ decomposition catalyst contains about 5% Co, 0.05% Ir.

The ruthenium catalyst employed herein is generally used in amounts in the range of 0.001 to 1 part by weight per 100 parts by weight of support, and other noble metal catalysts when employed herein can generally be used in the same ranges. However rhodium is generally effective at lower concentrations than other noble metals, and consequently is often employed at concentrations less than 0.005 part by weight per 100 parts by weight of support. Further description of rhodium catalysts useful herein is found in a copending application of one of us, Ser. No. 183,227, filed Sept. 23, 1971. If nickel, cobalt, or other base metals are used, the amounts are generally in the range of 1 to 10 parts by weight per 100 parts by weight of support, e.g. 5 parts by weight.

The catalysts as utilized herein are dispersed on a support, generally of inorganic oxides such as alumina, silica, boria, thoria, titania, strontia, magnesia, zirconia, hafnia or combinations thereof. However, there are definite advantages in utilizing materials upon which ruthenium is distributed in a highly dispersed state, such as activated alumina. Porous aluminas in various states of hydration can be advantageously used to provide good ruthenium dispersion. Activated aluminas in the form of spheres, pellets, rings or extrusions or other shapes can be used. Alternatively, the actives can be dispersed on alumina coatings, an underlying support body being used in this case may, or may not, be alumina.

Transition aluminas are suitable for use as a support for dispersing ruthenium. By the term transition alumina is meant an alumina other than alpha-alumina and also excluding certain hydroxides of aluminum. Reference is made to Technical Paper No. 10, second revision, from the Alcoa Research Laboratories. On page 9, various phases of alumina are enumerated. The following phases are not generally components in the finished catalysts of the present invention.

1. alpha alumina tri-hydrate—Gibbsite
2. beta alumina tri-hydrate—Bayerite
3. beta alumina tri-hydrate—Nordstrandite
4. alph alumina mono-hydrate—Boehmite
5. beta alumina mono-hydrate—Diaspore
6. alpha alumina—Corundum.

Of the above cited phases, the use of alpha alumina is definitely not desired. The other phases may be present in small amounts but are not the preferred starting materials for preparing the catalysts of the present invention.

A preferred support for the catalysts of the present invention thus consists predominantly of a transition alumina. Although minor amounts of the phases listed above can be present, we prefer to prepare the catalysts of the present invention with an alumina consisting of at least 51% transition alumina. In other words, a preferred alumina support for the catalysts of the present invention consists predominantly of one or more of the transition alumina phases identified by XRD as gamma, eta, theta, iota, chi or kappa. Alumina is generally used in the exemplifications herein, and it is to be understood that alumina can be substituted in place of any of the supports discussed herein.

Alumina surfaces contained on particles or on rigid, unitary geometrical forms are generally preferred. For example, particle forms are exemplified by spheres, extrudates, rings, hollow cylinders, granules, or other shapes. The alumina can be present in particle forms up to 100% by weight or be present only as a surface coating. Likewise, monolithic supports, whatever their composition, can be coated with alumina. Generally, when applying alumina coatings to a support, the coating will consist of at least 0.1 wt. percent of the coated material. Alumina coatings of about 3 to 10 wt. percent appear even more useful with catalytic composites of the present invention. Higher amounts of alumina, while not necessarily detrimental do not appear to be necessary with the small amounts of ruthenium preferred in the present invention.

Coatings can be applied in a variety of ways. A successful procedure involves use of dispersions of Dispal M alumina. The dispersion is conveniently made by use of acidic aqueous suspensions created by agitation. Among the acids which can be used are acetic, hydrochloric or nitric. A simple, effective procedure for obtaining the amount of coating required utilizes, on a weight basis, 20.0 g. Dispal M powder, 1.2 g. conc. $HNO_3$, and 78.8 g. $H_2O$. The alumina powder is added to the acidified water and then shaken vigorously to obtain a suspension. Such suspensions appear to be stable for at least two hours. Stable suspensions do not result if the nitric acid concentration is substantially greater or substantially less than that indicated. It is understood that suspensions with greater stability can result through judicious choice of acid, and additives such as surfactants, resins, etc.

The body to be coated is then dipped in the suspension. When monolithic supports are to be coated it is advantageous to clear the channels of excess solution after dipping, for example by passing a suitable gas through the monolith or by other suitable means. After drying and air calcining at about 500° C., adhering coatings of an appropriate thickness for use in the present invention result.

In the catalysts of the present invention the ruthenium is well-dispersed on the surface of the alumina support without much penetration into the surface of alumina particles. To obtain the desired effect from the small amounts of ruthenium involved, it is essential to have the ruthenium in position to contact the exhaust gases. It also appears advantageous that the alumina, prior to ruthenium deposition, be characterized by open pores with a minimum of small pores, as it appears that ruthenium deposited in small pores is subject to occlusion so as to prevent effective catalytic contact. It has been found that pre-calcining the alumina-containing body prior to deposition of the ruthenium produces a catalyst of better and more stable activity. It appears that the precalcination has the effect of reducing the size of or closing small pores, thereby preventing penetration of the ruthenium or noble metal salts into such pores and resulting in a greater concentration of the metals on the exposed surface of the alumina. However, regardless of the particular effect of precalcination, it definitely has a beneficial effect upon the activity of the catalyst. Precalcination involves heating the alumina containing support at high temperatures, such as in excess of 1200° F. in air for a number of hours, for example at temperatures in the range of 1200 to 2200° F. for 1 to 10 hours.

When particle support forms are used, it appears advantageous that the support possess suitable macroporosity. Macropore volume, as used herein, is defined as the pore volume from pores with pore diameter greater than 700 A. as measured by mercury porosimetry. Apparently the presence of macropores as defined leads to more effective utilization of the interior of individual particles. Whatever the reason for the increased efficiency through use of such supports, however, macropore volumes of about 0.05 to 0.5 cc./g. yield more effective results with particle forms of the catalysts of the present invention. Less than 80% of the porosity is from pores of 700 A. or less. After precalcination, the alumina supports may have surface areas less than 100 m.$^2$/gm.; and the use of such precalcined material is advantageous, although higher surface area supports are operative in the present invention, e.g. up to 300 or 400 m.$^2$/gm. or more. The surface area referred to is that determined by the BET method, i.e. Brunauer-Emmet-Teller. The particle sizes to be used with the catalysts of the present invention will depend upon factors including engine design, converter design and location. Generally speaking, particles sizes in the range of 4 mesh through 16 mesh appear useful.

Monolithic supports can be used to advantage with the ruthenium catalysts of the present invention. Such monolithic supports consist of unitary refractory or ceramic structures characterized by a plurality of relatively thin-walled cellular channels passing from one surface to the opposite surface, thus providing a large amount of geometrical surface area. The channels can be of one or more of a variety of cross-sections selected from a variety of shapes and sizes, each space being confined by a ceramic wall. Cross sections of the support represent a repeating pattern which can be described as lattice, corrugated, honeycomb, etc.

The dimensions of a suitable monolithic carrier for use in the present invention will depend on many factors including position of use in the exhaust train. Positions closer to the engine will favor more rapid heat-up as a consequence of higher exhaust gas temperatures. Generally speaking, when used in the post-manigold position, the volume of each monolith will be between about 15 and 80 in.$^3$ and will have from about to about 14 corrugations per inch. Wall thicknesses will be from about .005 to 0.15 inch thus creating an open area on face of the monolith of about 50 to 70%.

The chemical composition of said monolithic supports can consist of α-alumina, mullite, cordierite, spodumene, zircon, alundum, magnesium silicate, petalite, or combination thereof the refractory body being formed from these materials together with a suitable binder, such as clays, calcium carbonate, calcium aluminate, magnesium aluminate or combinations thereof. Generally, in the process of forming the rigid structure considerable porosity develops in the cell walls. For example, water absorptivities with β-spodumene monoliths may be 20 to 30% by weight or more.

As indicated previously, the refractory bodies will generally have an alumina coating deposited thereon. With the coating technique outlined hereinbefore with several different monoliths, the coating is uniformly distributed through the channels, and inside the cell walls. Pores are not entirely blocked by the alumina coating. Coating thicknesses are on the order of one micron with a 5% alumina coating.

Alumina coatings on monoliths, when precalcined, will have surface areas in the range of about 50 to 200 m.$^2$/g. depending on precalcination temperature, when considered on the basis of alumina coating weight alone. A more preferred range of alumina coating surface area, after precalcination will ordinarily be less than 100 m.$^2$/g. While the coating method outlined previously does not result in appreciable macroporosity, it is understood that suitable macroporosity can result through use of burn-out materials, inclusion of different powdered alumina types, etc.

It is further understood that other alumina starting materials can be utilized, for example DeGussa fumed alumina, Kaiser KCSA powder or others. An object in coating applications is to provide an adhering coating which retains good contact with the underlying substrate through repeated exposures to high temperatures and in the presence of typical exhaust gas compositions.

The coating techniques and requirements are equally applicable to nonunitary, nonrigid substrates. Examples of such materials include the shapes and sizes herein specified for particle forms of alumina and furthermore include the chemical compositions herein enumerated with regard to monolithic structures.

The catalysts of the present invention, using the supports described herein, can be prepared in variety of ways. Generally, the active component is added to the support, for example, by impregnation or by spraying from solutions of appropriate compounds. Examples of ruthenium compounds which can be used include the nitrate and halide or any other readily decomposable ruthenium salt. An appropriate solvent is chosen depending on the compound chosen.

With impregnation procedures, minimum solution techniques have certain advantages with the low levels of active utilized herein. Thus, if excess solution techniques are employed with aqueous solutions of Ru(NO$_3$)$_3$ or RuCl$_3$, selective adsorption can occur resulting in less control as to the amount of active deposited. The use of excess solution techniques, for example in adding ruthenium to an alumina coated monolith, however, can be utilized so long as care is taken to account for selective adsorption. This generally can be accomplished by control of solution concentration and adsorption time.

The ruthenium addition step is generally followed by air drying to remove the bulk of solution. With aqueous solutions, temperatures in the range of 60 to 200° C. can be employed, more preferably, however, in the range of 80 to 150° C.

The ruthenium compound can then be decomposed by a calcination step at temperatures of 250° to 450° C., generally in air, but this step can be omitted and the drying step can be directly followed by a reduction step.

The noble metal component is generally reduced to the elemental state, for example in a 10% hydrogen stream at 400 to 600° C. Suitable inert diluents are nitrogen or helium.

While much of the foregoing description is in terms of ruthenium, and particularly applicable to preparation of ruthenium catalysts, it is also applicable to preparation of other catalysts employed herein, particularly other noble metal catalysts.

It is to be understood that when reference is made herein to catalysts on an alumina support, that alumina coated ceramics or other materials are included as such supports and that the alumina support can be in particle or monolith form.

The following examples are illustrative of the invention.

EXAMPLE 1

Twenty grams of a beaded (8 x 14 mesh) alumina support was calcined at 1000° C. for about 6 hours to close the very small pores in the material so that active catalyst will not be deposited in areas where it is virtually inaccessible to the reactants. Using a minimum solution technique 0.02 gm. Ru was deposited on the spheres from 18.5 ml. of an aqueous solution of the nitrate salt. After impregnation, the material was dried at 120° C. overnight, calcined in air at 300° C. for 2 hours, then at 450° C. for 2 hours to decompose the nitrate anion. The Ru was then reduced at 500° C. in a 10% $H_2$ in He mixture (400 cc./min. measured at standard temperature and pressure) for 2 hours. Final composition: 0.1% $Ru/Al_2O_3$. Another typical beaded support which can, for example, be impregnated in accordance with this procedure has properties as follows:

| | |
|---|---|
| Physical form | 5 x 8 mesh spheres |
| Percent loss on ignition (1000° C.) | 5.6 |
| Surface area (m.²/g.) | 287 |
| Pore volume (cc./g.): | |
| Total | 0.99 |
| 0–700 A. | 0.73 |
| >700 A. | 0.26 |
| Bulk density | 29.0 |
| XRD phases | pseudo-gamma. |

EXAMPLE 2

The following is an illustrative example of the preparation of a Ru on $Al_2O_3$ coated monolith. A ⅝″ by ⅝″ cylinder of β-spodumene (Corning 9692 Cercor) refractory material was dried for 5 hours at 600° C. An $Al_2O_3$ dispersion was prepared by adding 1.2 gm. concentrated $HNO_3$ to 78.8 gm. $H_2O$. While stirring vigorously 20.0 gm. Dispal M $Al_2O_3$ (Conoco) was added over a 5 minute period. The resulting suspension was shaken on a wrist shaker for 15 minutes and resulted in a well dispersed solution. The monolith was then immersed in the $Al_2O_3$ dispersion and agitated to remove air bubbles. A gentle stream of $N_2$ was used to free the channels of the monolithic support from excess solution after which the coated monolith was dried in air for about 20 hours at 120° C. and calcined in air at 500° C. for 5 to 6 hours. The result was an alumina coating of about 5 wt. percent. For the reasons mentioned hereinbefore the $Al_2O_3$ coated monolith was then calcined for an additional 5 hours at 1600° F. In the impregnation of the Ru active it was assumed that the coated monolith had a 25% water absorptivity from which it was calculated that the concentration of the impregnating solution should be 0.004 gm. Ru per ml. to give a final catalyst loading of 0.1% Ru by weight.

After a five minute impregnation, the channels of the monolith were cleared with a stream of air and the composite was dried at 120° C. for 6–10 hours and calcined in air at 450° C. for five hours. The final reduction was carried out in a stream of 10% $H_2$ in He at 450° C. for three hours. Final composition: 0.1% Ru/5.1% $Al_2O$/Cercor monolith. The uncoated monolith employed in this example can, for example, have properties as follows:

| | |
|---|---|
| Chemical composition | β-spodumene |
| Physical form: | |
| Bulk density (gm./cc.) | 0.5 |
| Surface area (m.²/g.) [1] | 0.2 |
| Channels-per-inch | 16 |
| Wall-thickness (mils) | ~12 |

[1] Nitrogen adsorption via BET.

The above are general preparative methods and may be used for the majority of the catalysts described in the invention. However, this my no means is intended to exclude other well known methods of catalyst preparation such as precipitation methods, tableting methods, extrusion methods, etc. Neither do the above illustrations exclude the possibility of adding additional components for the purpose of improving thermal stability, resistance to sulfur or lead poisoning or other desirable catalyst properties.

The removal of impurities from the automotive exhaust in accordance with the invention will occur at elevated temperatures. The reduction of nitrogen oxides will generally involve temperatures in the range of 200° C. to 800° C., usually in the range of 400° to 600° or possibly 650° C., and the oxidations will also involve temperatures from about 200° C. to 800° C., with the lower limit depending on ignition temperature with the particular catalyst, and the upper limit depending upon catalyst stability. The constituents ordinarily present in the exhaust gases will usually serve to react with the nitrogen oxides and effect their reduction; and it is not necessary to inject ammonia or hydrocarbons into the exhaust to serve such purpose. As discussed herein, ammonia is itself a pollutant and its presence or generation presents problems, so its addition would be undesirable. The hydrocarbons, if added, could be subsequently removed by an oxidation catalyst. However, while feasible, the addition of fuels, other than those generated by the engine, gives no advantage, as sufficient hydrocarbons and carbon monoxide are generated by operation of the engine under the rich conditions usually desirable for smooth engine operation. The addition of hydrocarbons might be indicated if the engine were for some reason to be operated under lean conditions for long periods. With the ruthenium catalyst employed herein, it is not necessary to have oxygen present to retard ammonia production, and with operation on the rich side, oxygen concentrations will be very low. The concentration of oxygen which can be present without deleterious effect will depend upon the concentration of reductants, but the concentrations will not often be over 2% for the reduction and will usually be less than 1%, or less than 0.5% on a volume basis.

For much of the catalyst evaluation a special CRANOX testing system was used. CRANOX (Catalytic Removal of Automotive $NO_x$) is a fully automatic catalyst testing system controlled by a special-purpose digital controller. The control system is capable of testing a single catalyst at six different feed compositions (varying the air/fuel ratio) and at up to 256 different temperature levels. All pertinent data are acquired by the system, processed through a digital integrator and teletypewriter which generates a paper tape record of the run. This tape is processed by off-line computer which generates tables and graphs of catalyst performance parameters.

The CRANOX analytical system uses a dual-bed technique to determine the sum of ammonia and unconverted $NO_x$ leaving the reactor: a metered sample of the reactor product is diluted with a metered quantity of air and the mixture passed over a platinum-on-alumina oxidation catalyst. The effluent is then sent to an electrochemical transducer which measures the sum of NO and $NO_2$, an electrochemical cell operating on the principle of a fuel cell (Dynasciences NX–130 analyzer) being used for this purpose. Oxidation reactor conditions were found that resulted in quantitative conversion of ammonia to $NO_x$. The determination of the sum of ammonia plus unconverted $NO_x$ is an especially important measure of the effectiveness of an automotive $NO_x$ catalyst as it measures the worst-case performance that might be achieved in an actual dual-bed converter that would oxidize any ammonia formed in the $NO_x$ converter back to $NO_x$ in the oxidation converter.

The CRANOX feed-gas system generates the six feeds by synthetic dynamic blending of eight components to achieve a simulated automotive exhaust that is very close to an actual exhaust in which the air/fuel ratio is varied by carburetion changes. The flow rate over the test catalyst is held constant at 2100 ml./min. (STP) for all feeds. The normal catalyst sample is 3 ml. resulting in a space velocity of 40,000 hr.$^{-1}$. The catalyst is contained in a quartz tube 16 mm. I.D. which is in turn contained in a quartz test tube 25 mm. O.D. The flow pattern is arranged such that the incoming feed is preheated by flow through the annular space between the two tubes. This also results in near-adiabatic operation of the inner tube containing the catalyst. Both tubes are housed in a furnace consisting of a 1¼ inch stainless steel pipe maintained at a controlled temperature by radiant heat transfer from electrically heated coils surrounding the pipe.

While the analytical systems of CRANOX permit measurement of the oxidation performance of a catalyst under steady-state conditions, the actual vehicle use of the $NO_x$ catalyst as an oxidation catalyst is under transient conditions that can be approximated by the application of a large step-change to the feed gas while adding secondary air to the catalyst to achieve over-all oxidizing conditions. An experimental technique was developed to simulate these conditions and to measure the total amounts of both CO and hydrocarbons (HC) that leave the catalyst system during the first four minutes after the application of the high temperature pulse. The basic technique, named COSIM, has been completely automated for routine testing of beaded oxidation catalysts. The COSIM sampling system was utilized with the CRANOX system to measure performance of the $NO_x$ catalysts as oxidation catalysts. The temperature pulse was generated by simply removing the reactor from the furnace with flow bypassed and cooling the quartz tubes (by immersion in ice water) to 50° C. catalyst temperature. To start the oxidation run the flow was started to the reactor at the same time the tubes were placed in the furnace maintained at 500° C. A constant flow rate of the product gases was sent to an evacuated tank for 4 minutes, the contents allowed to mix, and then analyzed for CO and HC. Results are conveniently expressed as a percent of each pollutant remaining (in which the reference level is measured by repeating the experiment in the absence of a catalyst). It can be shown that the percent remaining figures are directly proportional to total pollutants, and is also a good measure of the so-called CVS cold-start performance of an actual vehicle equipped with a catalytic system.

The major function of an automotive $NO_x$ catalyst is to remove $NO_x$ from exhaust gases under rich conditions and with minimum ammonia formation. This should be accomplished under a wide range of air/fuel ratios and at all temperatures that are encountered in urban driving conditions. For most $NO_x$ catalysts, there are strong interactions of air/fuel ratio, temperature, ammonia production, and sometimes space velocity, which complicate catalyst characterizations. The single most important performance parameter is the sum of ammonia and $NO_x$ remaining after passage through the catalyst at a fixed space velocity. To be of practical use, the percent of original $NO_x$ remaining should be no greater than 20% or preferably no greater than 10% under space velocities no lower than 20,000 hr.$^{-1}$. One can then determine combinations of temperatures and air/fuel ratios that result in ammonia plus $NO_x$ less than 20% or less than 10% by volume of the original $NO_x$. For ready use, this requires further simplification due to interactions. Limiting the catalyst temperature to the region 500 to 650° C. is a realistic limitation since this is the range readily generated in a vehicle with the $NO_x$ converter located immediately downstream of the exhaust manifold, the most desirable location. Within this range, catalyst performance can be expressed by defining limiting air/fuel ratios over which the 10 or 20% remaining limitation occurs. On the rich edge of the "window" performance is usually limited by ammonia formation, often at the lower temperatures. Performance at the lean edge of the window is usually limited by availability of reductants and is usually near the stoichiometric point. Air/fuel ratios are most meaningfully represented by deviations from the stoichiometric point rather than absolute values. Thus, an air/fuel ratio of 13.8 lb. air/lb. fuel would be represented by $-0.9\Delta A/F$ for a fuel with a 14.7 stoichiometric point.

Another and simpler method of characterization is to use only one mixture such as a $-0.8A/F$ feed which is an average for typical carburetion. One can then determine catalyst temperatures for the 10 and 20% remaining criteria. This simple parameter is, unfortunately, somewhat misleading for catalysts based on ruthenium, since the percent ammonia plus $NO_x$ (almost all due to ammonia) goes through a minimum of about 4% at about 400° C., rises to a maximum of 10–20% remaining at about 550° C. and finally falls off to very low values at higher temperatures. For mixtures closer to stoichiometric, the minima and maxima are less distinct resulting in constant ammonia formation over large changes in catalyst temperature. Due to this phenomenon, a better performance parameter with the $-0.8\Delta A/F$ feed is the maximum percent ammonia plus $NO_x$ remaining in the critical temperature range of 500 to 650° C. This, we can characterize catalysts for $NO_x$ removal by three parameters:

(1) Maximum percent ammonia plus $NO_x$ remaining with $-0.8\Delta A/F$ feed, 500–650° C.
(2) Width of A/F window at 20% ammonia plus $NO_x$ remaining, 500–650° C.
(3) Width of A/F window at 10% ammonia plus $NO_x$ remaining, 500–650° C.

Characterization of oxidation performance is considerably simpler. The COSIM cold-start simulation generates a percent remaining for both CO and HC. These can be compared to values obtained with a common oxidation catalyst such as copper oxide—chromium oxide-on-alumina at the same space velocity.

EXAMPLE 3

This example demonstrates the characteristics of rhodium used at low levels on alumina-coated monolithic supports. A catalyst containing nominally 0.00025 part Rh/4.8 parts $Al_2O_3$/100 parts β-spodumene (Cercor 9692) was prepared and tested without aging in the CRANOX facility at 500° C.

|  | Percent remaining | |
| --- | --- | --- |
|  | $NO_x + NH_3$ | $NO_x$ only |
| $-0.8\Delta$ A/F feed | 98 | 11 |
| $0.0\Delta$ A/F feed | 7 | <1 |

It can be seen that this catalyst is an active $NO_x$ removal catalyst, but that it has a great tendency to produce ammonia under rich conditions.

EXAMPLE 4

This example demonstrates the characteristics of ruthenium used at low levels on alumina-coated monolithic supports. A catalyst containing 0.1 part Ru/5.1 parts $Al_2O_3$/100 parts β-spodumene monolith (Cercor 9692) was artifically "aged" in the CRANOX facility by holding at 900° C. for 15 hours in the $-0.8\Delta A/F$. The furnace temperature was lowered to 550° C. and 350 p.p.m. $SO_2$ was added to the —0.8ΔA/F feed for one hour. Evaluation of its $NO_x$ performance yielded the following:

Percent $NO_x+NH_3$ remaining, —0.8ΔA/F, maximum 500–650° C.=17%

A/F window at 10% $NO_x+NH_3$, 500–650° C.=0.44 lbs. air/lb. fuel

A/F window at 20% $NO_x+NH_3$, 500–650° C.=1.2 lbs. air/lb. fuel

Its oxidation performance was measured at

|  | Percent remaining | |
|---|---|---|
|  | HC | CO |
| Ru monolith | 86 | 76 |
| Reference catalyst | 57 | 46 |

These data show that ruthenium is an intrinsically low ammonia-former, but that its performance as an oxidation catalyst is relatively poor. The ruthenium coated monolith was prepared by a procedure as described in Example 2.

EXAMPLE 5

This example demonstrates the characteristics of a combination of a ruthenium and a rhodium catalyst in which the ruthenium catalyst is positioned upstream of the rhodium catalyst. The ruthenium catalyst was a cored sample (3 ml.) of a full-sized automotive catalyst which consisted of 0.028 parts Ru/5.1 $Al_2O_3$/100 parts β-spodumene monolith (Cercor 9692). The rhodium catalyst was the same as Example 3 (3 ml.). The two catalysts together then were tested under the usual 2100 ml./min. feed yielding a combined space velocity of 20,000 hr.$^{-1}$. Initial performance was 21% maximum ammonia plus $NO_x$ at —0.8A/F feed, 500–650° C.

Both catalyst were then aged in situ in the same feed at a 900° C. furnace for 21 hours, following which a complete evaluation of $NO_x$ performance yielded:

Percent $NO_x+NH_3$ remaining, maximum, —0.8ΔA/F 500–650° C.=19%

A/F window at 10% $NO_x=NH_3$ remaining=0.50

A/F window at 20% $NO_x+NH_3$ remaining=1.3

Both catalysts were then sulfur-poisoned in situ by operation at 500° C. during which time the digital control system cycled through each of the six feeds completing a cycle in 1.5 hour. The $SO_2$ level was 350 p.p.m. and was obtained by substituting $SO_2$ for the propylene feed normally used to represent hydrocarbons. Monitoring of ammonia and $NO_x$ performance disclosed no change during the 12-hour poisoning period that followed. Following the poisoning, complete performance evaluation yielded identical results to those obtained before sulfur poisoning.

Following both the hydrothermal aging and the sulfur poisoning, the catalysts were tested for cold-start oxidation performance yielding the following:

|  | Percent remaining | |
|---|---|---|
|  | HC | CO |
| Combination catalyst | 53 | 29 |
| Reference catalyst | 57 | 46 |

Comparing this performance to that of the first two examples shows that the combination catalyst possesses the low amonia character of the ruthenium catalyst of Example 4, with a slightly larger A/F window. This effect is due to the rhodium catalyst performance right at the stoichiometric point, a point at which the ruthenium performance is poor.

The most significant improvement of the combination catalyst is the oxidation performance which is due to the rhodium catalyst, in particular to the fact that the oxidation performance of the rhodium is not affected by the hydrothermal aging process. Other experiments have shown that while the $NO_x$ performance of ruthenium catalysts is actually improved by hydrothermal aging, the oxidation performance is drastically impaired.

EXAMPLE 6

This example demonstrates the importance of the order of the ruthenium and the rhodium in the combination. The aged and poisoned catalysts of Example 5 were placed in the reactor in reverse order: rhodium upstream and ruthenium downstream. The maximum ammonia plus $NO_x$ in the —0.8ΔA/F feed, 500–650° C. was measured at 80% remaining compared to 19% in Example 5. It might be expected from Example 3 that the percent remaining might have been 98% rather than 80%. The slight improvement is probably due to aging effects of the rhodium catalyst rather than ammonia decomposition by the ruthenium, since other experiments failed to detect any decomposition activity by ruthenium.

EXAMPLE 7

As yet another illustration of the importance of the order of the catalysts, temperature runs were made on catalyst sandwiches consisting of (A) 0.025 wt. percent Ru on $Al_2O_3$ coated monolith followed by 0.005 wt. percent Rh on $Al_2O_3$ coated monolith and (B) the same catalysts as in (A) but with the order reversed. The feed composition was as follows:

$NO_x$=0.15%, CO=1.0%, $H_2$=0.33%, $H_2O$≃2.5% and $N_2$=balance.

The overall space velocity of the sandwich package was 15,000 hr.$^{-1}$. The $NO_x$ analysis was done with Dynasciences NX–130 analyzer. Ammonia was measured by difference after reoxidation to NO over a 0.5% Pt/$Al_2O_3$ catalyst at 600° C. The percent $NO_x$ conversion, and the percent of $NO_x$ and ammonia remaining, were both plotted against temperature. It was found that the percent $NO_x$ conversion rose quickly to values over 95% for both catalyst arrangements, but that these values were obtained at somewhat lower temperatures when the ruthenium followed the rhodium. However, the percent remaining of $NO_x$ plus ammonia had fallen to 50% at 306° C., and then to about 32% at 340° C. for the arrangement with the ruthenium first, while the reverse arrangement had to be heated to 489° C. to produce a 50% decline in the $NO_x$+ammonia, a difference of over 180 centigrade degrees.

EXAMPLE 8

Tests were run on the following catalysts.

A. 0.1% Ru/5.1% $Al_2O_3$/β-spodumene monolith.
B. The catalyst in A, followed by a 5.8% Co/0.005% Rh/β-spodumene monolith.
C. The catalyst arrangement of B, after aging for 14 hours at 1620° F. in the exhaust gas test stream.

The percentages of $NO_x$ plus $NH_3$ remaining at various temperatures were as follows:

|  | Percent $NO_x+NH_3$ remaining | | |
|---|---|---|---|
|  | A | B | C |
| Temperature, ° C.: |  |  |  |
| 400 | 7 | 10 | 5 |
| 450 | 8 | 10 | 5 |
| 500 | 11 | 13 | 10 |
| 550 | 14 | 14 | 12 |
| 600 | 15 | 9 | 9 |
| 650 | 10 | 2 | 2 |

The results are much better than those obtainable from Pt, Ir, Pd, or Rh alone, which tend to have values above 50% under similar circumstances, most of which is $NH_3$. It will be noted that the combination catalyst gave better performance at the higher operating temperatures, possibly because of ammonia decomposition capability of the second catalyst. Thermal stability is also indicated by the results after aging in the rich feed stream. The test used in the above procedure consisted in passing a gas blend corresponding to an air-to-fuel ratio 0.8 unit on the fuel-rich or reducing side of stoichiometric over the catalyst bed at various catalyst temperatures and a constant gas space velocity of 40,000 hr.$^{-1}$. The percent $NO_x+NH_3$ remaining in the effluent at various temperatures was then determined.

EXAMPLE 9

A 0.1% Ru on alumina catalyst alone was compared with the same catalyst followed by a 5.8% Co, 0.005% Rh on Cercor catalyst. A gas mixture was used corresponding to that obtained by operating an internal combustion engine at the stoichiometric air/fuel ratio. The catalyst temperature was 650° C. and the space velocity was 40,000 hr.$^{-1}$. With only the first catalyst, 34% $NO_x+NH_3$ remained, while the value was reduced to 5% when the combination of catalyst was used. The second catalyst was beneficial under the described conditions utilizing a gas mixture obtainable toward the lean side of engine operations.

EXAMPLE 10

A 0.025% Ru/5.1% $Al_2O_3$/Cercor monolith was prepared using the procedures outlined earlier. A series of experiments were run at different temperatures using a synthetic gas blend simulating the exhaust from an engine operating at about an A/F ratio unit on the fuel rich side of stoichiometry. It was found that at a space velocity of about 40,000 hr.$^{-1}$ the percent ($NO_x+NH_3$) remaining in the effluent stream was less than 25% in the temperature range from 300° C. to 700° C. The average over this temperature range is slightly less than 20% remaining with a maximum of 25% remaining at 550° C.

With the temperature set at 550° C. a series of feed and space velocity variations were made. In general, the Ru catalyst gave percent $NO_x+NH_3$ remaining values below 20% over a $\Delta A/F$ ratio range from −0.8 to 0.0 units with respect to the stoichiometric point. Increasing the space velocity from 40,000 to 150,000 hr.$^{-1}$ gave slightly worse results as the A/F mixture approached the stoichiometric point from the rich side. The conclusion, however, is that the catalyst will perform quite well at space velocities as high as and possibly even higher than 150,000 hr.$^{-1}$ as long as the engine is operated within an A/F ratio range from 0.0 to 1.0 units on the fuel-rich side of stoichiometry. This range is allowable A/F ratio is much larger than obtainable with other catalysts, and will be approximately the same, or possibly better, when the ruthenium catalyst is used in conjunction with other noble metal catalysts as taught herein.

EXAMPLE 11

Conversion and $NO_x$ removal data were obtained on various loadings of ruthenium catalysts on monolithic supports. In all but one case the monolith had been precoated with alumina. The data include the 50% $NO_x$ conversion temperature, obtained at a constant feed containing no oxygen, and the percentages of $NO_x$ and $NH_3$ remaining at 600° C. and various specified oxygen contents. At a 0.01% loading, results are shown for a catalyst prepared from ruthenium nitrate, and also for a catalyst prepared from ruthenium chloride. The gas feed employed for testing utilized 0.15% NO, 1% CO, 0.33% $H_2$, about 3% $H_2O$, and oxygen as specified, all in a nitrogen diluent. The results were:

| Composition | 50% $NO_x$ T°., C. | Percent $NO_x+NH_3$ remaining | | |
|---|---|---|---|---|
| | | 0.00% $O_2$ | 0.25% $O_2$ | 0.50% $O_2$ |
| 0.01% Ru on $Al_2O_3$ coated monolith | 323 | 10.3 | 5.3 | 51.4 |
| 0.01% Ru on uncoated monolith | | 100.0 | 100.0 | 100.0 |
| 0.01% Ru on $Al_2O_3$ coated monolith (from nitrate) | 321 | 10.5 | 7.0 | 62.0 |
| 0.01% Ru on $Al_2O_3$ coated monolith (from chloride) | 320 | 15.6 | 16.2 | 46.1 |
| 0.0005% Ru on $Al_2O_3$ coated monolith | 404 | 44.4 | 70.5 | 100.0 |
| 0.001% Ru on $Al_2O_3$ coated monolith | 509 | 28.9 | 55.5 | 95.6 |
| 0.005% Ru on $Al_2O_3$ coated monolith | 325 | 10.0 | 6.7 | 75.8 |
| 0.010% Ru on $Al_2O_3$ coated monolith | 321 | 10.5 | 7.0 | 62.0 |
| 0.025% Ru on $Al_2O_3$ coated monolith | 298 | 9.3 | 5.3 | 14.0 |
| 0.100% Ru on $Al_2O_3$ coated monolith | 283 | 10.8 | 6.3 | 15.6 |

In this particular series, the uncoated catalyst, No. 2, was not at all effective. Some materials other than alumina have been found to be effective supports, but in general to be inferior to alumina, whether the alumina be in the form of activated alumina pellets, or alumina coated refractory materials such as zirconium silicate, cordierite, or β-spodumene. While the above results suggest an advantage in the catalyst prepared from chloride for use at higher oxygen levels, the nitrate salt is conveniently prepared and may be favored for use under conditions actually expected in automobile exhaust gases. In regard to the ruthenium loadings reported above, it should be noted that selective absorption is a problem in ranges below 0.01% Ru, and that actual values in this range may be somewhat higher than those nominal values reported. It appears that somewhere below a nominal 0.005% Ru, the performance is seriously impaired. The preferred loading will be in the range of 0.005% to 0.5% Ru by weight of support, with the upper limit being determined by economic considerations. The supported catalysts are suitably prepared by impregnation, followed by air drying at 60 to 200° C., air calcination at 450 to 600° C. for 4 to 5 hours, and a reduction in hydrogen-inert gas atmosphere for 2 to 4 hours at 400 to 600° C.

EXAMPLE 12

In order to illustrate the performance of the Ru, Rh combination catalyst at intermediate and high space velocities two ⁵⁄₁₆" x ⅝" (diameter) monoliths were placed back-to-back. The upstream catalyst contained 0.025% Ru/5% $Al_2O_3$/Cercor monolith while the downstream portion of the sandwich contained 0.0025% Rh/5% $Al_2O_3$/Cercor monolith. At a −0.20 A/F feed and a catalyst temperature of 550° C., the percent $NO_x+NH_3$ remaining at 40,000 hr.$^{-1}$ was 3.0% and 17% at 150,000 hr.$^{-1}$. With respect to each portion of the sandwich, the space velocities are 80,000 hr.$^{-1}$ and 300,000 hr.$^{-1}$ respectively, showing that both the catalyst sandwich and its individual components are capable of satisfactory performance at the upper limit of space velocities expected in auto exhaust applications.

The use of reduction catalysts as taught herein to reduce nitrogen oxides without substantial production of ammonia makes it possible to conduct a subsequent oxidation step without the necessity for careful temperature controls to avoid oxidation of ammonia to nitrogen oxides. The oxidation step is conducted in the presence of additional air over oxidation catalysts at elevated temperatures effective for such oxidation. The upper limit of temperatures is governed by considerations of thermal stability of the catalyst, e.g. up to 700° or 800° C. Thus the oxidation converter can be permitted to operate throughout the effective normal catalysis range, including temperatures which oxidize ammonia to $NO_x$, and it is not necessary to limit the temperatures to those not over 425° C. or similar values in order to avoid such oxidation. If desired, the oxidation can be conducted almost exclusively in the high temperature range where ammonia if present would be oxidized to $NO_x$. It will be noted that the temperature where such oxidation of ammonia occurs will be dependent upon the oxidation catalyst, but in general such oxidation will occur at somewhat lower values with noble metal catalysts than with base metal catalysts. Secondary air will be admitted for the oxidation, and will generally constitute at least 2 to 2.5% by volume oxygen in the oxidation converter. The air in the present system can conveniently be supplied by having an air conduit line with one branch which enters the exhaust conduit in advance of the reduction converter, and one branch which enters the exhaust conduit after the reduction converter but in advance of the oxidation converter, and appropriate valve and switching means to direct secondary air flow to one branch or the other, or to both branches, or to stop the air flow. The second converter can contain supported catalysts in which the supports are generally selected from the group consisting of alumina particles, monoliths, and alumina-coated monoliths and in which the catalytic composite contains active constituents deposited on the support which are generally selected from the group consisting of platinum, palladium, rhodium, iridium, ruthenium, copper, chromium, or other base metals or mixtures of the foregoing.

One of the significant advantages of the use of ruthenium herein is its resistance to sulfur poisoning, as automotive gasolines in general use have a sufficient sulfur content to make such poisoning of catalysts a definite problem. Thus, the use of reduction catalysts as taught herein, in combination with a sulfur resistant oxidation catalyst, viz noble metals, provides an exhaust treatment system in which the components are resistant to sulfur poisoning.

Various modes of utilizing the present invention in an automobile can be visualized. For the reduction stage, one of the most convenient and effective converters may be a small converter with a ruthenium catalyst on an alumina-coated monolithic support at the front entry end of the converter, immediately followed by a rhodium catalyst on an alumina coated monolithic support at the exit end of the converter.

The catalysts employed herein can contain various other components for various purposes, such as interspersants for stability or similar purposes, such as barium and rare earth oxide or metals.

What is claimed is:

1. A process for purifying exhaust gases from internal combustion engines which comprises contacting said gases at elevated temperatures under reducing conditions with a catalyst containing ruthenium and then with a catalyst containing another Group VIII noble metal, so that the gases contact the catalyst containing ruthenium before the catalyst containing the other noble metal, and contact both under reducing conditions.

2. The process of claim 1 in which the catalysts are coated on alumina-coated monolithic supports.

3. The process of claim 1 in which nitrogen oxide components in the exhaust gases are reduced to low levels with production of only small amounts of ammonia.

4. The process of claim 3 in which the exhaust gases at elevated temperatures in the range of 300 to 650° C. contact a catalyst combination consisting first of a section containing ruthenium well-dispersed on an alumina-coated monolithic support, and then with a section containing rhodium well dispersed on an alumina-coated monolithic support.

5. The process of claim 4 in which secondary air is added to the exhaust stream in advance of the catalyst for a short time after engine start to oxidize oxidizable components over the rhodium.

6. The process of claim 1 in which secondary air is added to the exhaust stream in advance of the catalysts for a short time after engine start to cause a rapid rise in temperature of the catalysts, and in which during the short period of secondary air addition, the overall gaseous mixture may be oxidizing.

7. The process of claim 6 in which the catalysts are coated on monolithic supports.

8. The process of claim 7 in which the monolithic support has an alumina coating.

9. The process of claim 8 in which the alumina-coated monolith is precalcined at temperatures in excess of 1200° F. prior to deposition of Ru or other noble metal actives.

10. The process of claim 6 in which the ruthenium catalyst is in the upstream section of a post-manifold converter, and the other noble metal catalyst is in the downstream section of the same converter.

11. The process of claim 6 in which the sum of the $NO_x$ and ammonia in the gases after contacting the catalysts is less than 20% of the $NO_x$ in the gases prior to contacting the catalysts.

12. The process of claim 6 in which the first catalyst consists of 0.005% to 0.1% by weight ruthenium component on its support and the other noble metal consists of rhodium constituting 0.005% to 0.1% by weight of its support.

13. The process of claim 6 in which the engine is operated with an air to fuel ratio on the rich side in the range from the stoichiometric point to —1.0 air to fuel ratio unit.

14. The process of claim 6 in which the support is a transition alumina.

15. A process for purifying exhaust gases of internal combustion engines which comprises conducting said gases through a first converter located close to the engine manifold and containing a ruthenium catalyst and another Group VIII noble metal catalyst and reducing nitrogen oxide components in the gases by contact with the catalysts in an order so that the gases contact the catalyst containing ruthenium before the catalyst containing the other noble metal, and contact both under reducing conditions, and adding secondary air to the effluent form the first converter and conducting the resultant gases through a second converter containing an oxidation catalyst other than ruthenium and oxidizing carbon monoxide and hydrocarbon components of said gases in the presence of no more than small amounts of ammonia to avoid substantial regeneration of nitrogen oxides.

16. The method of claim 15 in which the second converter contains a noble metal oxidation catalyst.

17. The process of claim 15 in which the other noble metal in the first converter is rhodium.

18. The process of claim 15 in which the second converter contains rhodium.

19. The process of claim 15 in which temperatures in the second converter are in the range of 200° to 800° C. and include temperatures in excess of 425° C. and sufficient to convert ammonia to NO.

20. The process of claim 15 in which the second converter contains a copper containing catalyst.

21. The process of claim 15 in which secondary air is admitted in front of the first converter for a short time after engine start.

References Cited

UNITED STATES PATENTS

| 3,118,727 | 1/1964 | Cohn | 423—239 |
| 3,230,034 | 1/1966 | Stiles | 423—213 |
| 3,257,163 | 6/1966 | Stiles | 423—214 X |
| 3,331,787 | 7/1967 | Keith et al. | 423—213 X |
| 3,397,034 | 8/1968 | Tulleners et al. | 423—214 |
| 3,637,344 | 1/1971 | Thompson | 423—214 |
| 3,662,540 | 5/1972 | Murphey | 60—301 |

GEORGE O. PETERS, Primary Examiner

U.S. Cl. X.R.

423—213.7; 60—301